INVENTORS
JAMES D. GALLAGER
JOSEPH L. MCKIBBEN

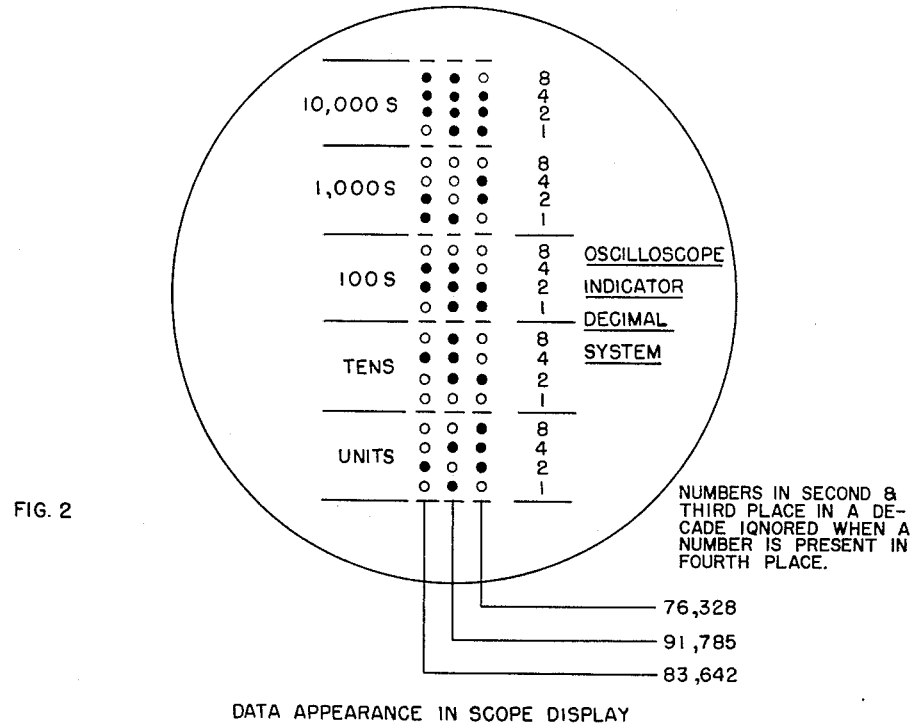

United States Patent Office 2,961,159
Patented Nov. 22, 1960

2,961,159

MULTI-CHANNEL ELECTRIC PULSE HEIGHT ANALYSER WITH BINARY CODED DECIMAL DISPLAY

James D. Gallagher and Joseph L. McKibben, Los Alamos, N. Mex., assignors to the United States of America as represented by the United States Atomic Energy Commission Filed June 6, 1956, Ser. No. 589,838

9 Claims. (Cl. 235—151)

This invention relates to electrical potential height pulse analysers and more particularly to multi-channel pulse height analysers capable of sorting pulses in accordance with amplitude and providing a count of pulses of each amplitude in binary-decimal form.

Nuclear researches have required the use of analysers which are capable of sorting electrical pulses in accordance with amplitude. The requirements are such that it is desirable to sort pulses of various heights occurring in rapid succession into a plurality of, for example, 100 channels. Various devices have been developed for the purpose. Some of these devices utilize pulse height discriminators for each channel with the result that, where many channels are desired, the number of electron tubes and the complexity of the device become deterrent factors against their use.

An analyser which achieves a great reduction in the complexity of multi-channel sorters is disclosed by G. W. Hutchinson and G. C. Scarrott in The Philosophical Magazine, 1951, vol. 42, pp. 792–806, the subject matter of which is hereby included by reference.

In this analyser, an input signal pulse is amplified and inverted in a window amplifier and then stored as a charge on a capacitor until sorted. The input is then clamped or blocked to prevent the admittance of other incoming signal pulses until the stored pulse is sorted. A comparison sweep in the form of a negative going linear sawtooth starting at 0 volts and having a terminal amplitude of —200 volts, is generated in synchronism with the circulation of information stored in a memory delay line of approximately 1230 microseconds in length. When the instantaneous voltage of the negative going linear sweep is equal to that of the stored pulse, the channel in the memory is selected into which a count corresponding to the amplitude of the stored pulse is placed. The input is then unclamped so that a next signal pulse is admitted and stored until sorted.

Unit pulses of information (hereinafter called bigits) are stored one microsecond apart in the memory giving a capacity of 1200 bigits and allowing about 30 microseconds for reset of the various circuits and restart of the linear sweep. The pulses for regenerating the circulating pulses in the memory delay line are derived from an oscillator having a square wave output hereinafter termed the bigit oscillator. A channel oscillator is provided to effect the storing of information in channels in the memory delay line corresponding to selected input amplitude ranges. The bigit oscillator and the channel oscillator are started in synchronization with the linear sweep. The channel oscillator is synchronized with every 10th, 15th or 20th pulse of the bigit oscillator to selectively provide 120, 80 or 60 channels, respectively. An adder circuit inserts each new incoming pulse into its proper place in the memory. The channel pulse locates the first bigit pulse in each channel of the memory and cooperates with the adder for the proper insertion of counts corresponding to new incoming pulses. The contents of the memory are displayed with a cathode ray oscilloscope tube. The oscilloscope horizontal sweep is synchronized with the comparison sawtooth sweep and the vertical sweep is initiated with each channel pulse. The beam current of the cathode ray tube is intensified by each pulse stored in the memory so that the binary contents of each channel are visible as a vertical row of dots. Permissible storage positions on the oscilloscope which contain zeros are indicated by less intense spots. It follows that the presence of a bigit "1" is therefore shown as a bright spot, and the bigit "0" by a dim spot. The information displayed by the oscilloscope in the Hutchinson-Scarrott analyser is in binary form.

Interpretation of the binary display involves a tedious and difficult translation problem for the operator of the equipment, particularly when the displayed spectrum contains a considerable number of counts. Accordingly, it is a prime object of the present invention to provide a pulse height analyser utilizing the basic principles of the Hutchinson-Scarrott design, but containing such novel features which effect a decimal display.

This object, other objects and advantages obtained by the present invention will become apparent on reading the following description with reference to the figures of the drawing made a part of this specification.

In the drawing, Figure 1 is a simulated oscilloscope display of the count in three channels of an analyser in binary fashion and Figure 2 shows the same counts in decimal form in accordance with this invention.

Figure 3:
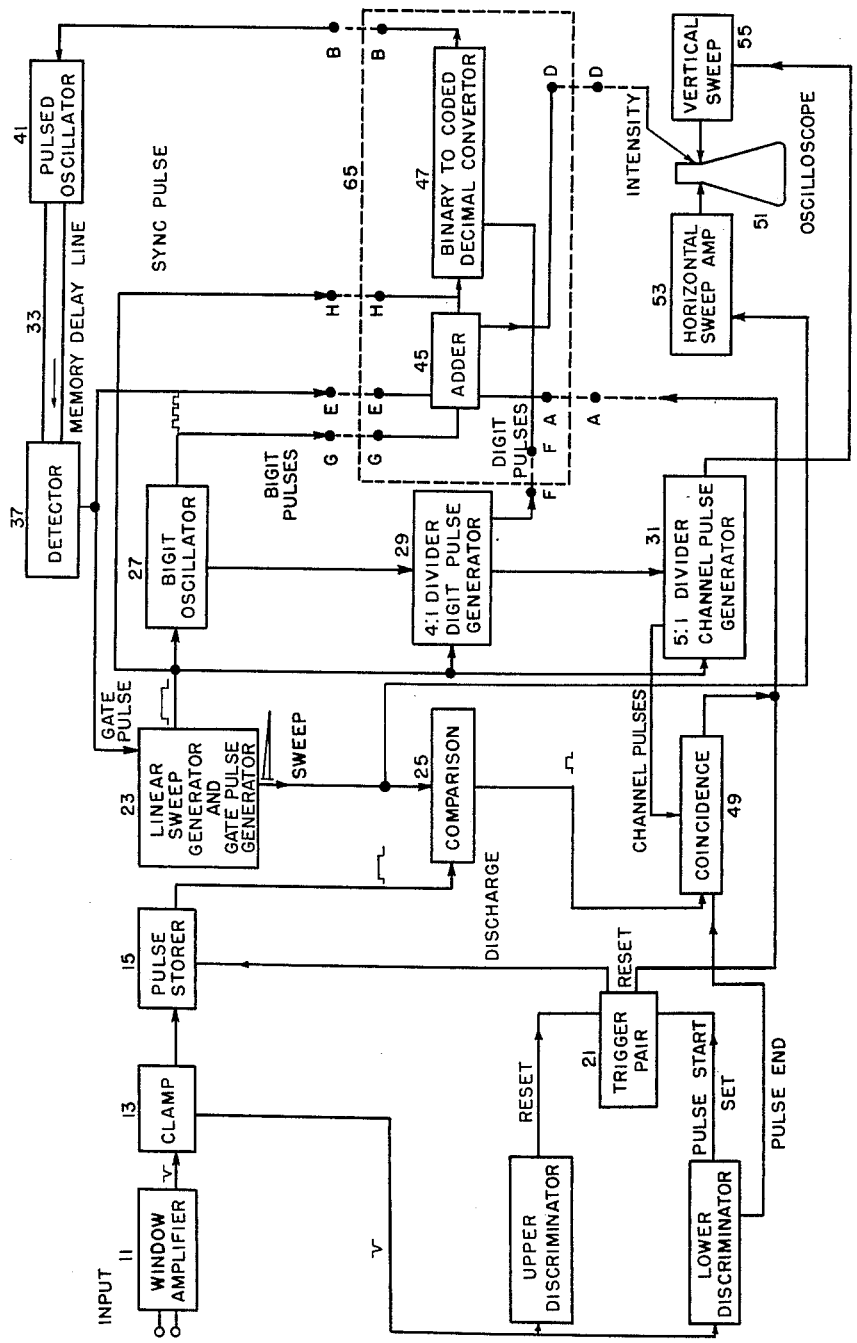
Figure 3 is a block diagram of an analyser, basically of the Hutchinson-Scarrott type but including the binary to binary-decimal conversion system of the present invention.

The manner in which the present invention achieves the conversion from binary storage and display to a coded binary-decimal storage and display is best explained with a brief consideration of the binary system.

The binary system is a series of two symbols, "1" and "0," representing the presence of or non-presence of 2 to a power. Each of the numbers thus represented is termed a bit or bigit. Thus, a four bigit number can have any variation of $2^3$, $2^2$, $2^1$, and $2^0$, i.e., 8, 4, 2 and 1. Each group of bigits is termed a digit. Thus, reading conventionally right to left 1001 is interpreted as $$2^3 + 0 + 0 + 2^0 = 9$$

It is convenient in binary apparatus system to increase a number by an integer of one, by converting, in sequence, bigits "1" to "0" and converting the first encountered bigit "0" to "1," and leaving the remaining bigits unchanged. Thus, the digit 0111 (7) increased by integer one would appear as 1000 (8). It also follows in the binary system that if information runs to high numbers, more bigits are used, i.e., would include higher powers of 2. An oscilloscope display of the counts in three channels in binary form is shown in Figure 1. It is apparent that deciphering a large number of channel counts in binary form is difficult and time consuming.

In a decimal system it is desired to provide a count of from zero to nine by each group of bigits, i.e., each digit, and to provide succeeding groups of digits in the decimal decade system. The conversion from binary to decimal presentation is accomplished by the present invention by inserting the fictitious addition of 6 in each group of four bigits, whenever a bigit is present in the fourth position in order that the usual system of reversing symbols until the first zero is converted to a one can be used. For example, 9 is represented in this system (reading from left to right) as

| thousands | hundreds | tens | units |
|-----------|----------|------|-------|
| 0000      | 0000     | 0000 | 1111  |

An addition of one to the sequence is simply obtained in the usual manner and is represented by

| thousands | hundreds | tens | units |
|-----------|----------|------|-------|
| 0000      | 0000     | 0001 | 0000  |

The next count (eleven) appears as

| thousands | hundreds | tens | units |
|-----------|----------|------|-------|
| 0000      | 0000     | 0001 | 0001  | and so on. This information displayed in this form in a vertical row on the face of an oscilloscope is easily and quickly interpreted, it being necessary only to ignore the bright spots in second and third positions in a digit when a bright spot is in fourth position.

Referring to Figure 2, the desired form of display on an oscilloscope is shown. Each channel is displayed as a row of vertical dots. The face of the oscilloscope tube can be provided with horizontal lines at the decade levels to facilitate reading the display. The total count in any channel is readily interpreted, it being remembered that where the fourth bigit in any decade is a "1" (numerical 8), the second and third "1's" are ignored. Thus, the righthand channel reads 70000, plus 6000, plus 300, plus 20, plus 8, i.e., 76328.

The over-all structure and operation of a multi-channel analyser system in accordance with the present invention is explained with reference to the block diagram of Figure 3.

Input signal pulses are impressed on window amplifier 11 which amplifies and presents as a negative output those input pulses having an amplitude falling within a selected voltage range. The output pulse from the window amplifier is stretched (stored), until sorted, in pulse storer 15. The clamp 13 prevents the passage into the pulse storer of additional input pulses until the stored pulse is sorted.

A comparison linear time sweep is generated by linear sweep generator 23. This sweep is in the form of a negative going sawtooth having an amplitude linearly increasing from zero to minus 200 volts. The linear sweep is generated in synchronism with the circulation of memory pulses in memory delay line 33.

When the instantaneous voltage of the linear sweep becomes equal to that of the stored pulse, the comparison circuit 25 passes a pulse through coincidence circuit 49 when the next channel pulse occurs to adder 45 which passes the pulse into binary to coded decimal converter 47 which in turn triggers pulsed oscillator 41 and one count is added to the sum present in the appropriate channel of a line memory 33. This memory is shown as a delay line, preferably of the fused quartz type, but it can be any type of line memory, including magnetic tape or magnetic drum, etc. The coincidence in magnitude of an instantaneous voltage of the linear sweep, the stored pulse and the next channel pulse also triggers trigger pair 21 to discharge the pulse storer 15 and to remove the clamp condition of clamp 13.

The structure and function of the upper and lower discriminator with respect to the trigger pair 21 is similar to that in the Hutchinson-Scarrott circuit as explained on page 799 of the afore-referenced Philosophical Magazine article.

The decade grouping of pulses in each channel circulated in the memory requires a departure from the Hutchinson-Scarrott system which stored pulses in the binary system. In accordance with the present invention, the preferred embodiment stores four bigits in each of five decimal digits (decades) in each channel. It follows that each channel stores a total of twenty bigits, in five digit or decade groups. Bigit oscillator 27 generates the bigit pulse. The bigit frequency is divided by four in the digit pulse generator 29 and the digit frequency is divided by five in the channel pulse generator 31.

Linear sweep generator 23 is coupled to detector 37 so that the linear sweep will be started by the first (sync.) pulse arriving from the memory during the sweep generator dead time. The bigit oscillator 27 and the digit and channel pulse dividers 29 and 31 are coupled through a gate pulse generator associated with the linear sweep generator. This provides a gate to start the pulse train with exactly the same timing for each memory cycle.

The bigit oscillator 27 is coupled to adder 45 through terminal G which is in turn coupled to binary-decimal converter 47. The add pulse, corresponding to a channel pulse coincident with the comparison circuit pulse, and therefore occurring at the beginning of a channel, and in coincidence with the least significant bigit of the channel, sets the adder so that the adder converts ones to zeros until the first occurring zero is changed to a one.

The contents of the memory are displayed on the face of oscilloscope 51. The horizontal sweep is provided by linear sweep 23 and horizontal sweep amplifier 53. The vertical sweep is provided by the vertical sweep generator 55 which is triggered by each channel pulse. The oscilloscope intensity control electrode is coupled to adder 45 so that, as shall presently become apparent, the presence or non-presence of bigits in the memory are displayed as bright and less bright spots respectively.

Figure 4:
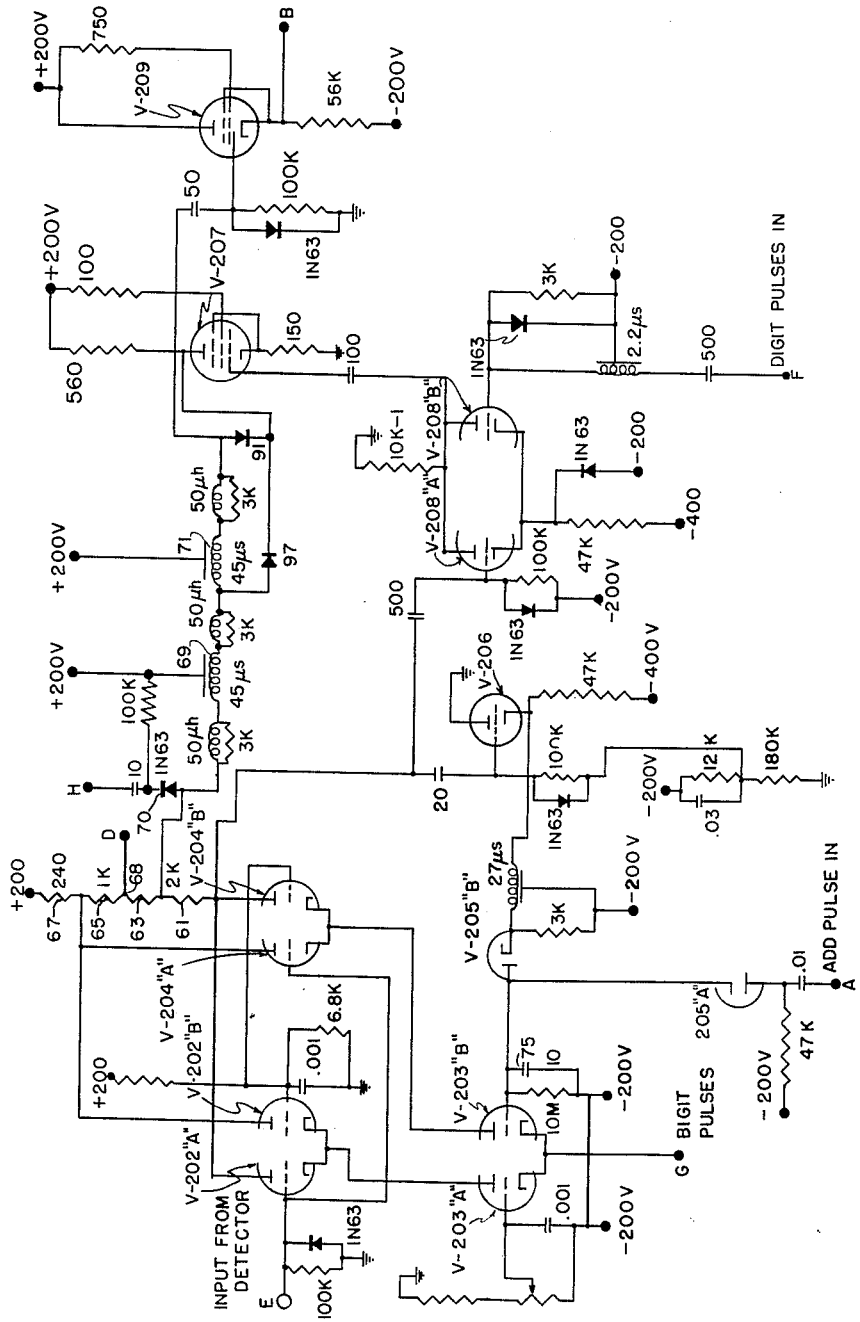
Figure 4 is a schematic circuit diagram of the adder, and binary to coded decimal device of the present invention.

The conversion from binary counting to decimal-binary counting is accomplished by the circuit of Figure 4. This circuit includes the portion 65 of Figure 3 and contains the novel features of the present invention. It is assumed for purposes of explanation that some information is already present in the memory delay line 33. Bigits in the form of "1's" and "0's" are detected as they emerge from the delay line and are translated by detector 37 into voltage pulses and the absence of voltage pulses in bigit spaces respectively. The pulses from the detector are impressed on the grid of V-202"A" and also on the grid of tube V-204"A". Triodes V-202"A" and "B" constitute a switching pair in which V-202"A" is biased more negatively than V-202"B." Triodes V-204"A" and V-204"B" constitute a switching pair having biases corresponding to that of V-202"A" and V-202"B." A positive pulse, such as a pulse from the detector impressed on the grid of V-202"A," renders V-202"A" rather than V-202"B" responsive to a coinciding current pulse at its cathode. The cathode of both V-202"A" and V-202"B" are connected to the anode of switch tube V-203"A." Tubes V-203"A" and V-203"B" are a switching pair in which the grid of V-203"A" is maintained more positive than the grid of V-203"B" except when an add pulse has occurred and a zero to one transformation has not yet taken place in the adder. It follows that in the absence of an "add" pulse, the existing pulses in the memory are regenerated and reinserted back into the memory without change as follows: The bigit pulses from the bigit oscillator are fed to the cathodes of V-203"A" and V-203"B" via terminal G as shown in Figure 4, and V-203"A" responds to each bigit pulse and routes the current to V-202"A" and V-202"B."

The coincidence of a positive memory pulse from the detector on the grid of V-202"A" and a bigit pulse on the cathode of V-202"A" from the bigit oscillator through switch tube V–203"A" results in conduction of V–202"A." The anode output across the sum of anode load resistors 63, 65 and 67 results in a full amplitude pulse being propagated through delay lines 69 and 71, through tube V–209, and by means of terminal B, to pulsed oscillator 41 which reinserts a negative pulse back in the memory.

The absence of a pulse from the detector, i.e., a "0" results in tube V–202"B" and not V–202"A" being conductive if a current pulse is impressed on its cathode by tube V–203"A" in response to a bigit pulse. Tube V–202"B" has only low ohmic resistor 67 as its anode load with the result that an insufficient pulse is transmitted through the delay lines 69 and 71 to output tube V–209 to register as a memory pulse although it has sufficient amplitude to register as a dim spot on the read-out oscilloscope. Thus, unless the contents in the memory are to be changed, whatever is stored in the memory is regenerated without change during each cycle of the device.

In the event an input signal pulse is present to be added to the count in a channel, a positive add pulse, coincident with a channel pulse, is applied by the signal pulse sorter just prior to the start of the next channel count to input terminal A and by means of rectifier V–205"A" and capacitor 75 is stored as a positive bias on the control grid of V–203"B." The bigit pulses from the bigit oscillator are therefore conducted through V–203"B" and not V–203"A" and are switched to the cathodes of switch tubes V–204"A" and V–204"B." Positive memory pulses ("1's") from the detector are applied to the grid of V–204"A" so that V–204"A" and not V–204"B" passes the pulses. Since the anode of V–204"A" faces only low ohmic load resistor 67, the "1's" from the memory are converted to zeros. The absence of a "1" from the memory coincident with a bigit pulse from the bigit oscillator results in the conduction of V–204"B" which faces the entire anode load and therefore is translated into a "1."

As mentioned previously, the occurrence of an add pulse as the result of coincidence circuit 49, (Figure 3) being triggered by a channel pulse results in establishing a charge on capacitor 75 and switching conduction to switch tubes V–204"A" and V–204"B." Therefore with regard to the pulses in the next channel, the switch tubes convert ones to zeros until a first detector zero is encountered at which time V–204"B" conducts a negative pulse and through tubes V–206 and V–205 discharges capacitor 75. Specifically, the negative pulse from adder tube V–204"B" is coupled to cathode follower V–206. V–206 is cathode coupled through a delay line to the cathode of diode V–205"B." The anode of V–205"B" is D.C. connected to capacitor 75. It follows, from the biases applied to V–205"B" that it is normally open-circuited and does not affect the charge on capacitor 75. However, the conversion of a zero to a one by adder tube V–204"B" results in conduction of V–206 and, after a slight delay in order not to chop the bigit being added, diode V–205"B" becomes fully conductive and discharges capacitor 75.

The synchronization pulse from the memory, i.e., trigger pulse to the linear sweep, must be reinserted into the memory delay line. The leading edge of the positive gate pulse is rectified by rectifier 70 and is utilized for the purpose and is reinserted through terminal H to the output of the adder. The synchronization pulse is also present as an input from the detector to the adder but since the bit oscillator has not yet started it has no effect.

The binary to binary-decimal conversion is effected by the two delay lines 69 and 71, coincidence tubes V–208"A" and "B" and associated components. Each of the delay lines has a propagation delay equal to one bigit period.

It is pointed out above that the digit oscillator is synchronized with each fourth bigit from the bigit oscillator. This relationship is utilized to insert second and third bigits whenever a fourth bigit is added to the memory in any digit series of four.

Tubes V–208"A" and V–208"B" provide a coincidence circuit responsive only to simultaneous negative pulses on the two control grids. Negative polarity "adder" pulses on the anode of tube V–204"B" are coupled to the grid of V–208"A" but, in the absence of a negative pulse on the grid of V–208"B," have no effect in producing an output pulse across the common anode resistor. However, a negative adder pulse on the anode of V–204"B" impressed on the grid of V–208"A" simultaneously with the impression on the grid of V–208"B" of a negative digit pulse is a fourth bigit pulse. The coincidence in tubes V–208"A" and V–208"B" results in a positive pulse being impressed on the grid of inverter tube V–207. A negative insertion pulse is generated at the anode of inverter tube V–207 and has two paths. The pulse is coupled through rectifier 91 to the end of the serially connected delay lines 69 and 71 and thence directly to output tube V–209, and it is also coupled through rectifier 97 to the mid-point connection of delay lines 69 and 71. Therefore, at the instant of the occurrences of this add pulse on the anode of adder tube V–204"B," i.e., on the beginning of the delay lines, the insertion pulse is simultaneously impressed on the grid of output tube V–209, and on the middle of the delay lines. Consequently the second place insertion bigit is immediately inserted in the memory. One bigit space later the insertion pulse previously injected into the mid-point of the delay lines is being inserted into the memory. One bigit space later, the fourth place bigit from the anode of the adder tube reaches the end of the delay lines and is inserted in the memory.

The intensity voltage for the display oscilloscope is obtained from the string of anode resistors 61, 63, 65, 67 at the junction 68 between resistors 63 and 65. A "1" pulse through the entire string of resistors results in a "bright" intensity voltage pulse and a "0" pulse through resistor 67 results in a "dim" intensity voltage pulse.

In order to facilitate the practical utilization of the present invention, values of components are presented in Figure 4. The identification of tubes is as follows:

| | Type |
|---|---|
| V–202 | 6J6 |
| V–203 | 6J6 |
| V–204 | 6J6 |
| V–205 | 6AL5 |
| V–206 | 6J6 |
| V–207 | 6CB6 |
| V–208 | 6J6 |
| V–209 | 6AV6 |

There has been described above a method and apparatus for converting binary information into binary-decimal form for both memory insertion and display purposes. While this invention has been described in connection with a multi-channel pulse height analyser, and it is apparent that it is of especial utilization in that regard, it is not intended that it be limited to that purpose. Accordingly, it is intended that the scope of this invention be defined only by the appended claims taken in view of the prior art.

What is claimed is:

1. In combination a coded decimal numerical storage and information display system having a live memory in which information is stored in coded decimal form in a plurality of channels, and a binary adder which in the presence of number to be added is set to change "1's" to "0's" and "0's" to "1's" until the first "0" to "1" has been converted; and a binary to coded-decimal converter comprising a bigit pulse oscillator, a digit pulse oscillator having one-fourth the frequency of the bigit pulse oscillator, a channel oscillator synchronized with the last bigit in a channel, a pair of serially connected delay lines each having a delay duration equal to one bigit period connected between the output of the binary adder and the input to said memory, means for synchronizing the digit pulse oscillator output with every fourth pulse output of the bigit oscillator, an input signal source, comparator means synchronized with said live memory for generating a sorted pulse in time phase for insertion in the next channel in the memory, a coincidence gate having one input coupled to the comparator means and a second input coupled to the channel oscillator whereby an adder conditioning pulse is generated just previous to the start of the next channel which sets said adder to convert "1's" to "0's" and a first "0" to a "1" in the binary fashion, a coincidence circuit coupled to said digit oscillator and to the output of the adder whereby a coincidence pulse is generated whenever an "0" to "1" adder output pulse and a digit pulse are coincident, means for coupling the coincidence circuit output with the output end of the delay lines and with the junction of the serially connected delay lines whereby an add pulse coincidence with a fourth bigit from the bigit oscillator effects the insertion into the memory of information bits in second, third, and fourth position of each bigit group.

2. In combination with a pulse height analyser capable of sorting signal pulses into selected groupings in accordance with selected pulse height ranges having a bigit oscillator and an adder for recording in a live memory with binary procedure the number of signal pulses falling within each group and displaying the number of counts in each group on an oscilloscope trace; apparatus for translating the binary information into coded decimal form of 4 bigits in each decade and five decades per channel, comprising a digit pulse oscillator and a channel pulse oscillator, said digit pulse oscillator having one-fourth the frequency of the bigit pulse oscillator and having an output synchronized with every fourth bigit pulse, said channel pulse oscillator having a frequency equal to the bigit pulse frequency divided by the selected number of bigits in each channel, and being generated slightly previous to the first of said bigits in a next channel; an oscilloscope, a source of vertical sweep potential for said oscilloscope, means for triggering said vertical sweep potential source by said channel pulse, means responsive to each adder output pulse for intensifying the oscilloscope beam, means responsive to the simultaneous occurrence of an adder fourth bigit output pulse and a digit pulse for promptly inserting an information bit in the memory and for inserting an information bit in the memory with a delay equal to one bigit oscillator pulse period, and means for inserting after two bigit periods into the memory the adder fourth bigit output pulse, means for impressing a horizontal sweep on said oscilloscope and means for synchronizing said last means with the cycling of information in said memory.

3. Apparatus for displaying a numerical count in a coded binary-decimal system in which four bigits provide each decade and in which the presence of the second and third bigits are ignored when a fourth bigit is present; comprising a bigit pulse oscillator, a digit oscillator having one-fourth the frequency of the bigit pulse oscillator and being synchronized with each fourth bigit, a channel oscillator having a frequency of output equal to one-fourth the bigit oscillator divided by the selected number of decades per channel and being synchronized with the last bigit pulse per channel, an adder, means coupling the input of the adder to said bigit pulse oscillator, adder switching means coupled to a source of input signal pulses and to the channel pulse oscillator and responsive thereto to activate said adder to the bigit pulse oscillator, whereby said adder transformer "1's" to "0's" until the first "0" to "1" conversion is made and it generates an output "1" pulse responsive to input signal pulses to be counted, a delay line having a propagation delay equal to two bigit pulse periods and having a tap connection at its mid-point, a live memory, said delay line connecting the adder output to the memory, means responsive to simultaneity of an adder output "1" pulse and a digit pulse for generating a conversion pulse, means for simultaneously inserting said conversion pulse in the memory and in the mid-point of said delay line, whereby said conversion pulse provides a second and third bigit prior to the arrival at the memory of the adder output pulse, whereby the information bits in said memory are in coded binary-decimal form.

4. The device of claim 3 including a linear sweep generator, means synchronizing the channel pulse oscillator with the last decade last bigit pulse, and an oscilloscope having a vertical sweep source and a horizontal sweep source, means coupling said channel pulse to the vertical sweep source, and means coupling the oscilloscope horizontal deflection means to the linear sweep generator.

5. The apparatus of claim 3 including a detector connected to the output of the memory, means coupling the output of the detector to the input of the adder, said oscilloscope having at least a beam intensifying electrode, and means for coupling the output of the adder output to said intensifying electrode.

6. A pulse height analyser comprising a sequential live memory for storing binary "1's" and "0's," a memory input oscillator and a memory information detector, said memory having an information circulation cycle, means for generating a linear sawtooth wave in synchronism with the memory cycle, a bigit pulse oscillator; means for generating an add pulse in response to an input signal pulse at the instant the sawtooth wave has an amplitude equal to the amplitude of the input pulse, a binary adder coupled to said memory information detector and to said bigit oscillator; means responsive to the simultaneous occurrence of an add pulse, a detector output bigit "1" and bigit pulse oscillator output pulses for converting the "1's" to "0's" until the first "0" encountered is converted to "1," means for delaying the converted bigit pulses two bigit pulse periods coupled to said adder output and to said memory input oscillator and means responsive to the conversion of any fourth bigit from a binary "0" to a binary "1" to insert second and third place binary "1's" in the memory before the placing in the memory of said fourth bigit.

7. The pulse height analyser of claim 6 including a cathode ray oscilloscope, cathode ray horizontal deflection means, vertical deflection means and beam intensifying means in said oscilloscope, means synchronizing the horizontal deflection means with each pass of memory information through said memory information detector, a channel pulse oscillator having $1/n$ frequency where $n$ is the total selected bigits in each channel, means synchronizing the channel pulse oscillator with the last bigit in each channel, means for triggering the oscilloscope vertical sweep with said channel pulse oscillator output, and means coupling the adder output to the oscilloscope intensifying means whereby the contents of the memory are displayed on said oscilloscope as horizontally displaced vertical rows of lighted spots signifying the number of counts in each channel in coded decade decimal form.

8. In combination with a binary adder and a live memory wherein the adder delivers a negative pulse when converting a vacant bigit space in the memory into a "1," apparatus for inserting binary information into the memory and on a cathode ray oscilloscope in numerical decade form and in which each decade consists of four bigit spaces and wherein a bigit in last place in a decade causes the insertion of bigits in second and third places which are ignored in oscilloscope read-out, comprising a bigit pulse source, a digit pulse source synchronized with the bigit pulse source fourth pulse, means including a pair of serially connected delay lines each having a delay duration equal to a bigit period coupling the adder output to the input of the memory, coincidence pulse generating means having two inputs and an output and having one each of said inputs coupled to the adder output and to the digit pulse source, means coupling the output of said coincidence means to the memory input and to the junction of said serially connected delay lines, whereby the coincidence of an adder output pulse and a digit pulse results in the insertion into the memory of second, third and fourth place bigits.

9. In combination with a binary adder and a delay line memory, a device for converting binary information into coded decimal form in channels comprising, a source of evenly spaced bigit pulses, a source of digit pulses coupled to said source of bigit pulses and synchronized therewith so that each digit pulse occurs simultaneously with each fourth bigit pulse, a pair of serially connected delay lines each having a delay constant equal to one bigit period, one end of the delay lines being coupled to the adder output and means coupling the other end to the delay line memory input, coincidence pulse generating means being coupled to the adder output and to the source of digit pulses and adapted to generate an output pulse upon the coincidence of an adder output pulse and a digit pulse, means electrically coupling said coincidence pulse generating means to the input of the delay line memory and to the mid-point connection of said pair of serially connected delay lines, whereby an adder output pulse to be inserted in a fourth bigit space in the memory results in the insertion in said memory of two information pulses before the fourth bigit pulse is inserted.

References Cited in the file of this patent

UNITED STATES PATENTS

| | | |
|---|---|---|
| 2,543,907 | Gloess et al. | Mar. 6, 1951 |
| 2,587,741 | Libois | Mar. 4, 1952 |
| 2,617,883 | Anger | Nov. 11, 1952 |
| 2,677,760 | Bess | May 4, 1954 |
| 2,772,399 | Jacobsen | Nov. 27, 1956 |
| 2,914,757 | Millership et al. | Nov. 24, 1959 |

FOREIGN PATENTS

| | | |
|---|---|---|
| 678,427 | Great Britain | Sept. 3, 1952 |

OTHER REFERENCES

Hutchinson-Scarrott, "A High Precision Pulse Height Analyser of Moderately High Speed," The Philosophical Magazine (Br.), vol. 42, July 1951, pp. 792–806, pp. 795 and 800 especially relied on.